(12) United States Patent
Chhabra et al.

(10) Patent No.: US 11,778,101 B2
(45) Date of Patent: Oct. 3, 2023

(54) PERFORMING AN OPERATION RESPONSIVE TO A VOICE CALL

(71) Applicant: Micron Technology, Inc., Boise, ID (US)

(72) Inventors: Bhumika Chhabra, Boise, ID (US); Swetha Barkam, Meridian, ID (US); Zhao Zhao, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 32 days.

(21) Appl. No.: 17/178,438

(22) Filed: Feb. 18, 2021

(65) Prior Publication Data

US 2022/0263947 A1 Aug. 18, 2022

(51) Int. Cl.
*H04M 3/533* (2006.01)
*H04M 3/436* (2006.01)
*H04W 4/12* (2009.01)
*H04W 4/16* (2009.01)
*H04M 3/42* (2006.01)

(52) U.S. Cl.
CPC ... *H04M 3/53383* (2013.01); *H04M 3/42102* (2013.01); *H04M 3/4365* (2013.01); *H04W 4/12* (2013.01); *H04W 4/16* (2013.01)

(58) Field of Classification Search
CPC ......... H04M 3/53383; H04M 3/42102; H04M 3/4365; H04W 4/12; H04W 4/16
See application file for complete search history.

(56) References Cited

U.S. PATENT DOCUMENTS

| 6,249,765 | B1 | 6/2001 | Adler |
| 6,574,599 | B1 | 6/2003 | Lim |
| 9,948,772 | B2 | 4/2018 | Miller |
| 9,955,015 | B2 | 4/2018 | Stifelman |
| 2016/0100050 | A1* | 4/2016 | VanBlon ................. H04W 4/16 455/415 |
| 2016/0234664 | A1* | 8/2016 | Vendrow ............. H04M 3/5141 |
| 2017/0237853 | A1* | 8/2017 | Miller ................. H04M 1/6041 455/563 |
| 2018/0020093 | A1 | 1/2018 | Bentitou |
| 2021/0044943 | A1* | 2/2021 | Chu ........................ H04W 4/16 |
| 2021/0344790 | A1* | 11/2021 | Arshad ............. H04M 3/42374 |

* cited by examiner

*Primary Examiner* — Minjung Kim
(74) *Attorney, Agent, or Firm* — Brooks, Cameron & Huebsch, PLLC (57) ABSTRACT

Methods, devices, and systems related to performing an operation responsive to a voice call are described. In an example, a method can include storing data representing a number of contact lists on a memory of a first computing device, wherein the data representing the number of contact lists includes data representing credentials of a number of contacts on the number of contact lists, receiving data representing a voice call and credentials of a second computing device at the first computing device, comparing the data representing the credentials of the second computing device with the data representing the credentials of the number of contacts on the number of contact lists to determine which contact list the second computing device is included in, and performing an operation at the first computing device at least partially based on which contact list the second computing device is included in.

12 Claims, 4 Drawing Sheets

PERFORMING AN OPERATION RESPONSIVE TO A VOICE CALL

TECHNICAL FIELD

The present disclosure relates generally to performing an operation responsive to a voice call.

BACKGROUND

A telephone is a device that permits two or more users to conduct a conversation when they are too far apart to be heard directly. Sound can be converted into electronic signals and can be transmitted via cables, cellular networks, Wi-Fi, or other channels to another telephone.

When a phone call is missed the call can be directed to a voicemail. The caller can leave a voice message that will be stored for a user in a voicemail inbox. The user can access their voicemail inbox and listen, continue to store, and/or delete the voice message.

DETAILED DESCRIPTION

The present disclosure includes methods, apparatuses, and systems related to storing data representing a number of contact lists on a memory of a first computing device, wherein the data representing the number of contact lists includes data representing credentials of a number of contacts on the number of contact lists, receiving signaling including data representing a voice call and credentials of a second computing device at a first processing resource of the first computing device from a radio in communication with a second processing resource of the second computing device, comparing at the first processing resource the data representing the credentials of the second computing device with the data representing the credentials of the number of contacts on the number of contact lists to determine which contact list the second computing device is included in, and performing an operation at the first computing device at least partially based on which contact list the second computing device is included in.

The first computing device can be, for example, a smartphone, a wearable device, a tablet, a laptop, a desktop computer, a smart assistant device, or any combination thereof. The first computing device can receive and/or place voice calls wired and/or wirelessly via cables, cellular networks, Wi-Fi, or other channels.

In a number of embodiments, the first computing device can collect and store data from a voice call and/or a voice message. For example, the first computing device can collect and store an area code, a phone number, and/or voice data.

The first computing device can conduct an internet search on the area code and/or phone number to collect data about the purpose of the voice call, the subject matter of the voice call, the importance of the voice call, and/or a user of the second computing device. In some examples, the first computing device can perform voice recognition and/or word recognition on the voice data to determine the purpose of the voice call, the subject matter of the voice call, the importance of the voice call, and/or the user of the second computing device. In a number of embodiments, the first computing device can input the area code, the phone number, and/or the voice data into an artificial intelligence (AI) model to determine the purpose of the voice call, the subject matter of the voice call, the importance of the voice call, and/or the user of the second computing device.

In response to determining the purpose of the voice call, the subject matter of the voice call, the importance of the voice call, and/or the user of the second computing device, the first computing device can perform an operation. The operation can include sending a message to the second computing device, forwarding the voice call to a third computing device, forwarding a message from the second computing device to the third computing device, sending data from the first computing device to the second computing device, or sending data from the first computing device to the third computing device.

As used herein, "a number of" something can refer to one or more of such things. For example, a number of contacts can refer to one or more contacts. A "plurality" of something intends two or more. Additionally, designators such as "P", "Q", "R", "T", and "U", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, reference numeral 100 may reference element "0" in FIG. 1, and a similar element may be referenced as 200 in FIG. 2. In some instances, a plurality of similar, but functionally and/or structurally distinguishable, elements or components in the same figure or in different figures may be referenced sequentially with the same element number (e.g., 222-1, 222-2, and 222-P in FIG. 2). As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Figure 1:
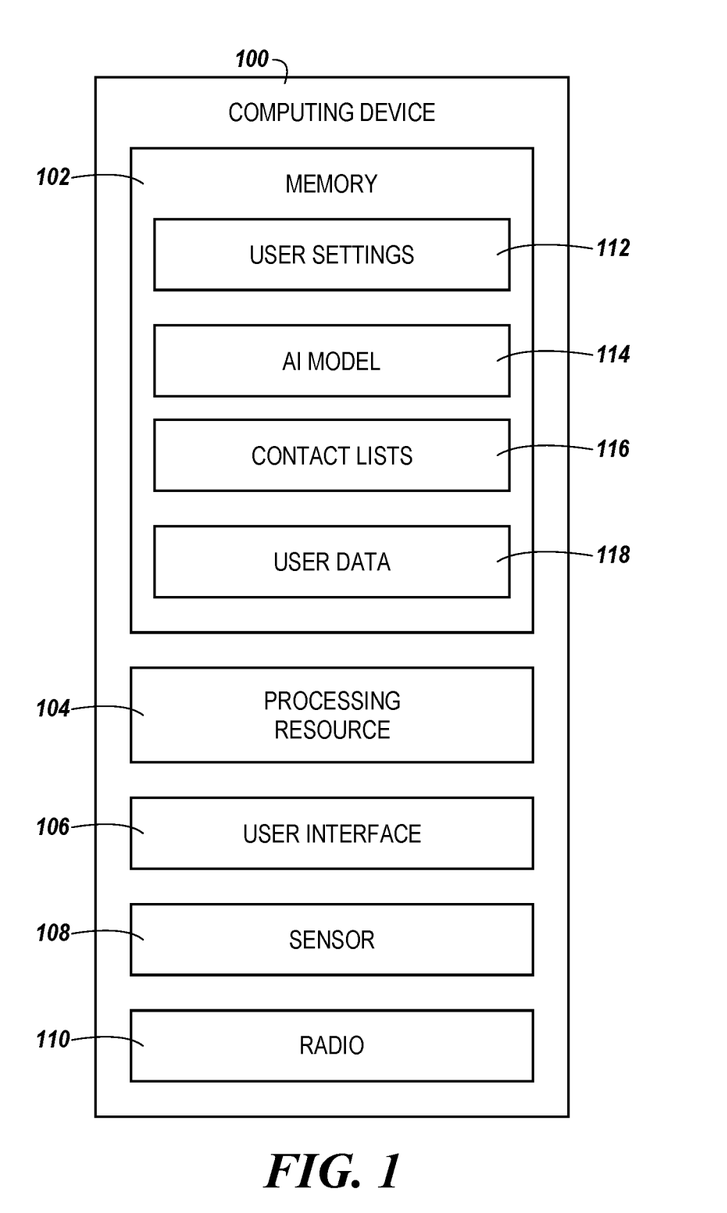
FIG. 1 illustrates an example of an apparatus for performing an operation responsive to a voice call in accordance with a number of embodiments of the present disclosure.

FIG. 1 illustrates an example of a computing device 100 for performing an operation responsive to a voice call in accordance with a number of embodiments of the present disclosure. The computing device 100 can be, but is not limited to, a smartphone, a wearable device, a tablet, a laptop, a desktop computer, a smart assistant device, or any combination thereof. The computing device 100 can receive and/or place voice calls via cables, cellular networks, Wi-Fi, or other channels.

A memory 102, a processing resource 104, a user interface 106, a sensor 108, and/or a radio 110 can be included in and/or coupled to the computing device 100. The memory 102 can be coupled to the processing resource 104 and can store an AI model 114. The memory 102 can be any type of storage medium that can be accessed by the processing resource 104 to perform various examples of the present disclosure. For example, the memory 102 can be a non-transitory computer readable medium having computer readable instructions (e.g., computer program instructions) stored thereon that are executable by the processing resource 104 to store data representing a number of contact lists 116 on memory 102 of the computing device 100, wherein the data representing the number of contact lists 116 includes data representing credentials of a number of contacts on the number of contact lists 116, receive signaling including data representing a voice call and credentials of a different computing device at the processing resource 104 of the computing device 100 from the radio 110 in communication with a processing resource of the different computing device, compare at the processing resource 104 the data representing the credentials of the different computing device with the data representing the credentials of the number of contacts on the number of contact lists 116 to determine which contact list the different computing device is included in, and perform an operation at the computing device 100 at least partially based on which contact list the different computing device is included in.

As used herein, signaling can include a communication (e.g., a radio signal) that carries data from one location to another. In some examples, the computing device 100 can include a communication device (e.g., intermediary device), such as, but not limited to, a radio 110.

The processing resource 104 can include components configured to enable the computing device 100 to perform AI operations. In some examples, AI operations may include training operations or interference operations, or both. In a number of embodiments, the AI model 114 can be trained remotely in a cloud using sample data and transmitted to the computing device 100.

In a number of embodiments, contact lists 116 and/or user data 118 can be stored in memory 102 and/or inputted into the AI model 114. In some examples, collected data from a voice call and/or a voice message can be inputted into the AI model 114. For example, the computing device 100 can collect and store an area code, a phone number, a time of the voice call, a date of the voice call, a voice call count over a period of time, and/or voice data.

User data 118 can be data collected from a user of the computing device 100. The user data 118 can include a user's schedule, contacts, health, heartrate, age, location and/or physical state. The computing device 100 can collect the user data 118 from a wearable device, a sensor 108, a user's calendar, an email contact list, a phone contact list, an email, and/or a text message and input the user data 118 into the AI model 114.

In some examples, the computing device 100 can be worn, carried, and/or kept near a user. Accordingly, the computing device 100 can collect user data 118 from one or more sensors 108 included and/or wired and/or wirelessly coupled to the computing device 100. The sensor 108 can be a heart rate sensor, a thermometer, an accelerometer, a gyroscope, a magnetometer, a microphone, a proximity sensor, an ambient light sensor, a touch screen sensor, a fingerprint sensor, or a global positioning system. The user data 118 can be inputted into the AI model 114. For example, the AI model 114 can determine the user is asleep using sensor data from the heart rate sensor, the accelerometer, the microphone, the ambient light sensor, and/or the global positioning system. In some examples, the processing resource 104 can transmit signaling including data representing one or more messages based on the collected user data 118.

In a number of embodiments, user settings 112 can be inputted via user interface 106 and stored in memory 102. The user interface 106 can be generated by computing device 100 in response to one or more commands. The user interface 106 can be a graphical user interface (GUI) that can provide and/or receive information to and/or from the user of the computing device 100. In a number of embodiments, the user interface 106 can be shown on a display of the computing device 100.

The user settings 112 can include one or more contact lists 116, one or more voicemail greetings, and/or one or more directives. Each contact list can include a number of contacts (e.g., contacts 222-1, 222-2, . . . , 222-X in FIG. 2). The contact lists 116 can include contact credentials. Contact credentials can include a contact's name, telephone number, email address, profession, relationship to the user, and/or the one or more contact lists 116 the contact is included in. A user can create a contact list for family members, for example, and select a number of contacts that are family members. Other contact lists 116 that the user can create can include emergency contacts, coworkers, spam callers, and/or friends.

The user can create and/or store data representing a number of messages. For example, the user can record a number of voicemail greetings, write a number of emails, and/or write a number of text messages and store the messages in memory 102. One of the number of messages can be selected and sent in response to the computing device 100 receiving a voice call and/or a voice message. The computing device 100 can determine which message to transmit (e.g., which voicemail greeting to play, which email to send, and/or which text message to send) to the missed caller based on the user settings 112, the contact lists 116, and/or the user data 118. For example, the user can record a voicemail greeting for contacts included in the friend contact list. In response to missing a call from a number included in the friend contact list, the prerecorded voicemail greeting can be played for the missed caller.

In some examples, a custom voicemail greeting can be generated using the AI model 114. For example, if the missed caller is included in a particular contact list, the AI model 114 can include user data 118 in the custom voicemail greeting. In response to a user being in a meeting, the voicemail greeting could say that the user is in a meeting and provide a time when the meeting will be over. In response to the user being asleep, the voicemail greeting could say that the user is sleeping and provide a time when the user usually wakes up.

In a number of embodiments, the user can create and store forwarding call directives, forwarding message directives, and/or transmitting sensor data directives as user settings 112. For example, a voice call and/or a voice message can be forwarded to a particular contact. The computing device 100 can forward the voice call and/or the voice message to a contact based on the user settings 112. The user can direct doctor's calls to people on the family contact list, for example. The AI model 114 can determine that the voice call is from a doctor by searching for the telephone number on the internet and/or matching the telephone number to a contact included in a contact list.

A contact list can have a sequence of people. For example, the sequence of the user's family contact list can start with the user's spouse, then child, and then parent so that the call will first be forwarded to their spouse, then their child, and then their parent.

In some examples, the user can direct a voice message to be forwarded to people on the user's coworker contact list. The computing device 100 can collect data about the purpose of the call, the subject matter of the call, the importance of the call, and/or the caller from the voice message using voice and/or word recognition.

The collected data can be inputted into the AI model 114. For example, the collected data could be a portion of the voice message, the entire voice message, a transcript of a portion of the voice message, and/or a transcript of the entire voice message. The AI model 114 can determine that the voice message is work related and urgent based on the words, phrases, sentences, tone of the voice message, and/or the voice of the caller. For example, the AI model 114 can determine that the voice message is urgent if the voice message includes the phrase "as soon as possible" and as such, determine that the voice message should be forwarded.

The AI model 114 can determine that the voice message is work related and the voice message should be forwarded to people on the user's coworker contact list if the voice message includes the voice of a customer. The AI model 114 can determine the identity of the caller from the tone, cadence, accent, and/or vocabulary of the caller, for example. Accordingly, the computing device 100 can forward the voice message to the people on the user's coworker contact list.

In a number of embodiments, the computing device 100 can transmit user data 118 to people on a user's friend vacation contact list. The user can direct particular user data 118 to be sent to a particular contact list in response to user settings 112 and/or user data 118. For example, the computing device 100 can send a GPS location of the computing device 100 to a user's friend vacation contact list in response to the AI model 114 determining the user is on vacation and the user is unresponsive.

The AI model 114 can determine the user is on vacation from a user's calendar events, plane ticket email confirmations, hotel email confirmations, and/or GPS. The AI model 114 can determine the user is unresponsive in response to the computing device 100 receiving a number of phone calls, emails, and/or texts without the user receiving and/or responding to them, the computing device 100 receiving no inputs from the user for a period of time, the sensor data 108 detecting an abnormal heart rate and/or no heart rate, and/or the GPS of the computing device 100 being in a dangerous location. In response to the AI model 114 determining the user is on vacation and unresponsive, the AI model 114 can determine that the GPS location of the computing device 100 should be sent to people on the user's friend vacation contact list and accordingly, the computing device 100 can send the GPS location to people on the user's friend vacation contact list.

The user can be notified before and/or after a voice call is forwarded, a message is forwarded, and/or sensor data is transmitted. The notification can be an alert, a text, an email, and/or a voice call. For example, the computing device 100 can display a notification on the user interface 106. In some examples, the user can stop a call from being forwarded, a message from being forwarded, and/or sensor data from being transmitted by inputting a command prior to the call being forwarded, the message being forwarded, and/or the sensor data being transmitted.

In some examples, the user can be notified via an alert, a text, an email, or a voice call on the user's computing device 100 and/or a wearable device that the user missed an important voice call. The AI model 114 can determine that the call is important from the telephone number, words, phrases, sentences, and/or the tone, cadence, accent, and/or vocabulary of the caller.

Figure 2:
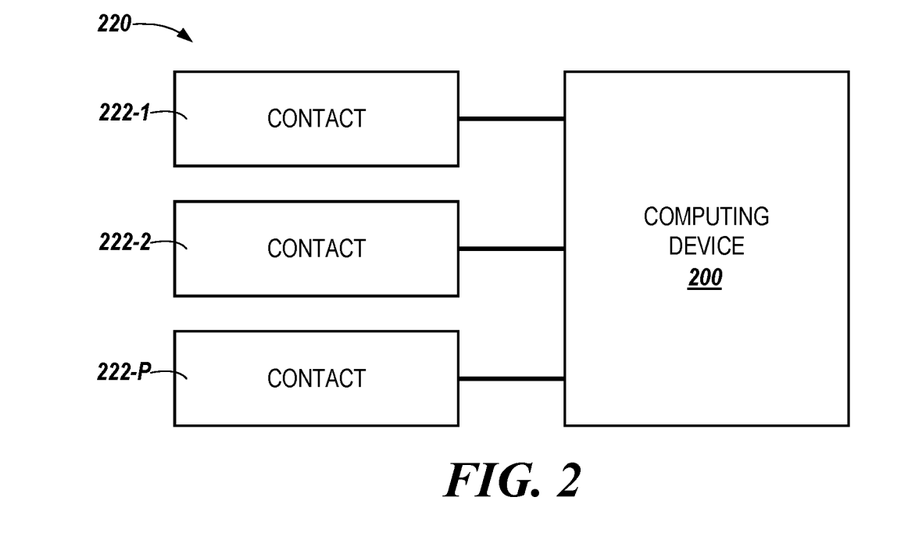
FIG. 2 illustrates an example of a system for performing an operation responsive to a voice call in accordance with a number of embodiments of the present disclosure.

FIG. 2 illustrates an example of a system 220 for performing an operation responsive to a voice call in accordance with a number of embodiments of the present disclosure. The system 220 can include a computing device 200, which can correspond to computing device 100 in FIG. 1, and a number of contacts 222-1, 222-2, . . . , 222-X. The computing device 220 can be a wearable device, a smartphone, a tablet, a laptop, a desktop computer, a smart assistant, or any combination thereof and can include a memory, a processing resource, a user interface, and a radio, as previously described in connection with FIG. 1.

Each of the number of contacts 222-1, 222-2, . . . , 222-X can be a computing device, a wearable device, a smartphone, a tablet, a laptop, a desktop computer, a smart assistant, or a telephone. Each of the number of contacts 222-1, 222-2, . . . , 222-X can be included in one or more contact lists stored in memory of the computing device 200. A user can create a contact list for family members, emergency contacts, coworkers, spam callers, and/or friends, for example, and select a number of contacts for each contact list.

Contact data associated with each of the number of contacts 222-1, 222-2, . . . , 222-X can also be stored in contact lists (e.g., contact lists 116 in FIG. 1) in memory. The contact data can include a contact's name, telephone number, email address, profession, relationship to the user, and/or the one or more contact lists the contact is included in. A portion or all of this data can be sent from a contact of the number of contacts 222-1, 222-2, . . . , 222-X to the computing device 200 and/or a portion or all of this data can be created by the user of the computing device 200 and/or determined by the computing device 200 using an AI model (e.g., AI model 114 in FIG. 1), for example.

The user can record a number of voicemail greetings, write a number of emails, and/or write a number of text messages. One of the number of voicemail messages, one of the number of emails, and/or one of the number of text messages can be sent in response to the computing device 200 receiving a voice call and/or a voice message from one of the number of contacts 222-1, 222-2, . . . , 222-X. The computing device 200 can determine which voicemail greeting to play, which email to send, and/or which text message to send to the contact based on which contact list the contact is included in. For example, the user can record a voicemail greeting for contacts included in the spam contact list. In response to missing a call from a spam caller, the prerecorded voicemail greeting for contacts included in the spam contact list can be played for the spam caller.

In a number of embodiments, the user can create forwarding call directives, forwarding message directives, and/or transmitting sensor data directives. For example, contact 222-1 can be forwarded to contact 222-2. The computing device 200 can forward contact 222-1 to contact 222-2 in response to the data of contact 222-1 and the user settings. For example, contact 222-1 can be the school of the user's child and contact 222-2 can be the user's spouse. If the user's spouse also does not answer, the phone call from the school can be forwarded to contact 222-X, which can be a user's parent, for example.

In some examples, the user can direct a voice message to be forwarded to one or more of the number of contacts 222-1, 222-2, . . . , 222-X that are included in a particular contact lists. The computing device 200 can collect data and use the collected data to determine the purpose of the call, the subject matter of the call, the importance of the call, and/or the identity of the caller to determine whether or not the voice message should be forwarded and/or who the voice message should be forwarded to. One or more of the contacts 222-1, 222-2, . . . , 222-X can receive the voice message as a phone call, a voice message in their voicemail inbox, a voice memo in a text message, an attachment to an email, a transcript in a text message, and/or a transcript in an email.

In a number of embodiments, the computing device 200 can transmit user data to one or more of the number of contacts 222-1, 222-2, . . . , 222-X on a particular contact list. The user can direct particular user data to be sent to a particular contact list in response to user settings, collected data, and/or user data. In some examples, the computing device 200 can send location data and/or medical data, for example, heartrate data, to a user's medical contact list in response to the AI model determining the user is incapacitated and/or injured. A user's medical contact list could include contact 222-1 as a user's primary doctor, contact 222-2 as an emergency responder, and/or contact 222-X as a spouse of the user. The AI model can determine the user is injured and/or incapacitated from the user's heart rate data and/or GPS and/or in response to the user missing a number of voice calls over a particular period of time, for example.

In response to the AI model determining the user is incapacitated and/or injured, the AI model can determine that health sensor data and/or a GPS location of the computing device 200 should be sent to contacts 222-1, 222-2, and 222-X included in the user's emergency contact list. Accordingly, the computing device 200 can send the health sensor data and GPS location to contacts 222-1, 222-2, and 222-X. The sensor data can be received by the one or more contacts 222-1, 222-2, . . . , 222-X in a voice call, a text message, and/or an email.

Figure 3:
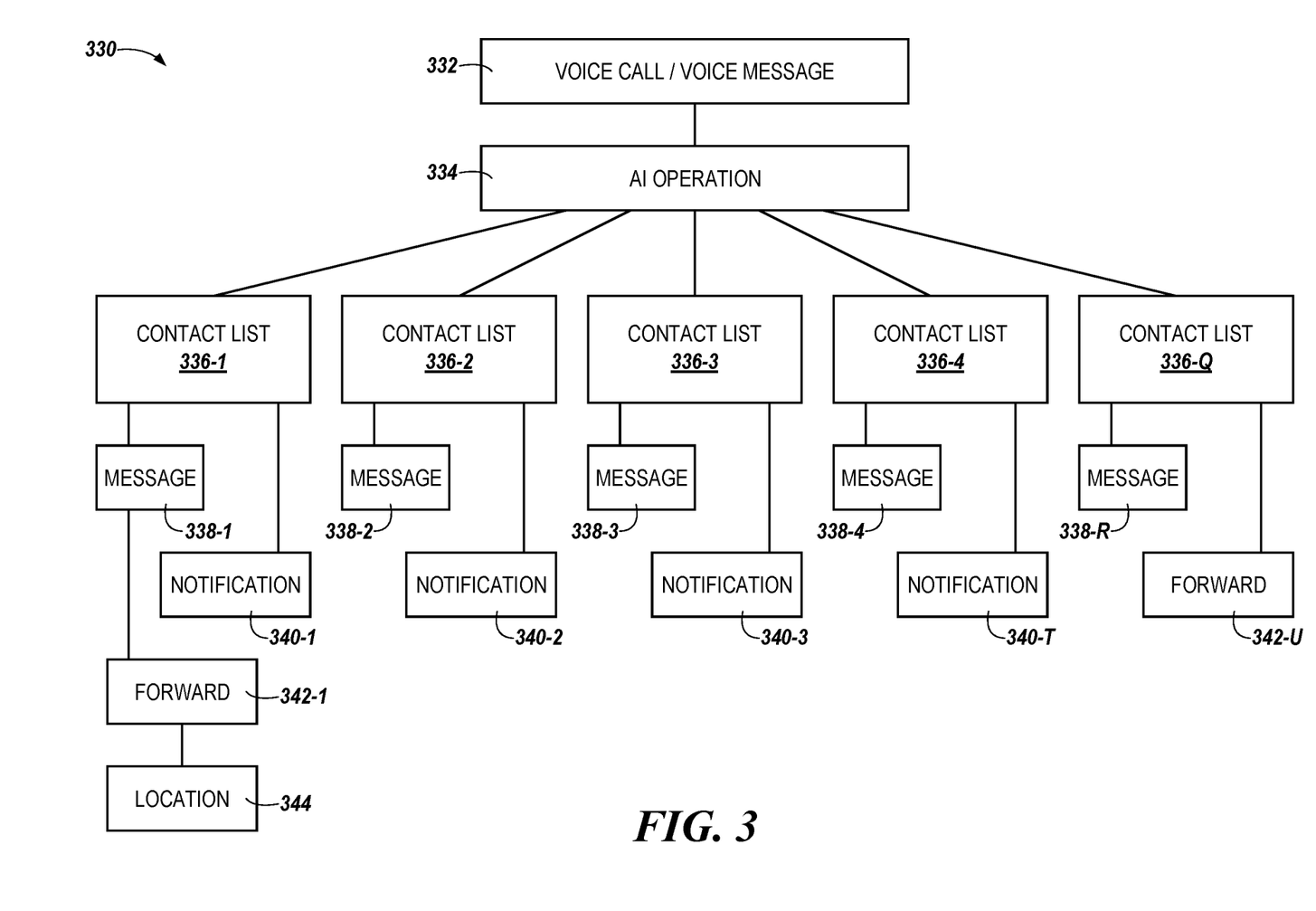
FIG. 3 illustrates an example flow diagram of performing an operation responsive to a voice call in accordance with a number of embodiments of the present disclosure.

FIG. 3 illustrates an example flow diagram 330 of performing an operation responsive to a voice call in accordance with a number of embodiments of the present disclosure. A computing device (e.g., computing device 100 in FIGS. 1 and 200 in FIG. 2) can receive data representing a voice call and/or voice message 332 and credentials of a different computing device making the voice call and/or voice message 332.

The computing device can perform an AI operation 334 using an AI model (e.g., AI model 114 in FIG. 1). An AI operation 334 can determine which contact list the different computing device is included in and based on which contact list the different computing device is included in whether to transmit a message 338-1, 338-2, 228-3, 338-4, and 338-R, display a notification 340-1, 340-2, 340-3, and/or 340-T, forward 342-1 and 342-U the voice call and/or voice message 332, and/or transmit a location 334 of the computing device. The AI operation 334 can also determine what particular message 338-1, . . . , 338-R and/or what particular notification 340-1, . . . , 340-T can be sent. The AI operation 334 can be performed on the data representing the voice call and/or voice message 332, the credentials of the different computing device, the determined contact list the different computing device is included in, and/or user data.

The data representing the credentials of the different computing device can be compared, at a processing resource (e.g., processing resource 104 in FIG. 1) and/or during the AI operation 334, to the data representing credentials of a number of contacts on a number of contact lists 336-1, 336-2, 326-4, . . . , 336-Q to determine which contact list the different computing device is included in. Credentials can include a contact's name, telephone number, and/or email address, for example. In some examples, the different computing device can be determined to be included on contact list 336-1 in response to a telephone number of the different computing device matching a telephone number of a contact in contact list 336-1. Contact list 336-1 can include close friends and family, contact list 336-2 can include friends and family, contact list 336-3 can include colleagues, contact list 336-4 can include vacation friends, and/or contact list 336-Q can include doctors, for example.

The AI operation 334 can determine to transmit a message 338-1, 338-2, 338-3, 338-4, or 338-R in response to receiving a voice call and/or voice message 332 from a contact included in contact list 336-1, 336-2, 336-3, 336-4, or 336-Q, respectively. Messages 338-1, . . . , 338-R can be voice messages, emails, and/or a text messages. In some examples, messages 338-1, . . . , 338-R can include data from the user. For example, messages 338-1, . . . , 338-R can include what the user is doing (e.g., the user is in a meeting or sleeping), when the user will be available, and/or when the caller should call back.

In a number of embodiments, the AI operation 334 can determine to notify the user about a voice call or a voice message by a notification 340-1, 340-2, 340-3, 340-T in response to receiving a voice call and/or voice message from a contact included in contact list 336-1, 336-2, 336-3, or 336-4, respectively. Notifications 340-1, 340-2, 340-3, 340-T can be text displayed on a user interface (e.g., user interface 106 in FIG. 1), a text message, an email message, a sound, a vibration, and/or a light. Notifications 340-1, 340-2, 340-3, 340-T can include data about the contact, voice call, and/or voice message. In some examples, notifications 340-1, . . . , 340-T can be transmitted to the user every thirty minutes to remind the user that they missed a voice call and/or have a voice message.

The AI operation 334 can determine to forward 342-1, . . . , 342-U a voice call and/or voice message 332 in response to receiving a voice call and/or voice message 332 from a contact included in contact list 336-1 or 336-Q and/or in response to determining the voice call and/or voice message 332 is urgent. The AI operation 334 can determine a voice call and/or voice message 332 is urgent based on the contact list the different computing device is included in, a threshold number of voice calls from the different computing device, a heartrate of the user, and/or a location of the computing device. For example, if a different computing device is included in contact list 336-Q and the AI operation 334 identifies words used in the voice message 332 as urgent, the voice message 332 can be forwarded to a pre-defined contact and/or contact list 336-1, . . . , 336-Q. In some examples, if a contact is included in contact list 336-1 and the AI operation 334 identifies the voice call and/or voice message 332 as urgent because the contact has called a threshold number of times, the voice call and/or the voice message 332 can be forwarded to a pre-defined contact and/or contact list 336-1, . . . , 336-Q.

A voice call and/or voice message 332 can be determined to be non-urgent by the AI operation 334 based on the contact list the computing device is included in, the number of voice calls being below a threshold number of voice calls, a heartrate of a user, and/or a location of a user. In some examples, signaling including data representing a notification 340-1, . . . , 340-T that the voice call and/or voice message is non-urgent can be transmitted to a user interface in response to the voice call and/or voice message being determined to be non-urgent.

In a number of embodiments, the AI operation 334 can determine to transmit a location 344 of the user. For example, if a contact is included in contact list 336-1 and the contact has repeatedly called and the user has not answered and/or called back in over a period of time, the AI operation 334 can determine to transmit the location 344 of the user to a pre-defined contact and/or contact list 336-1, . . . , 336-Q. The AI operation 334 can also determine to transmit signaling including data representing a location 344 of the user to a pre-defined contact and/or contact list 336-1, . . . , 336-Q in response to the AI operation 334 determining the user is incapacitated.

Figure 4:
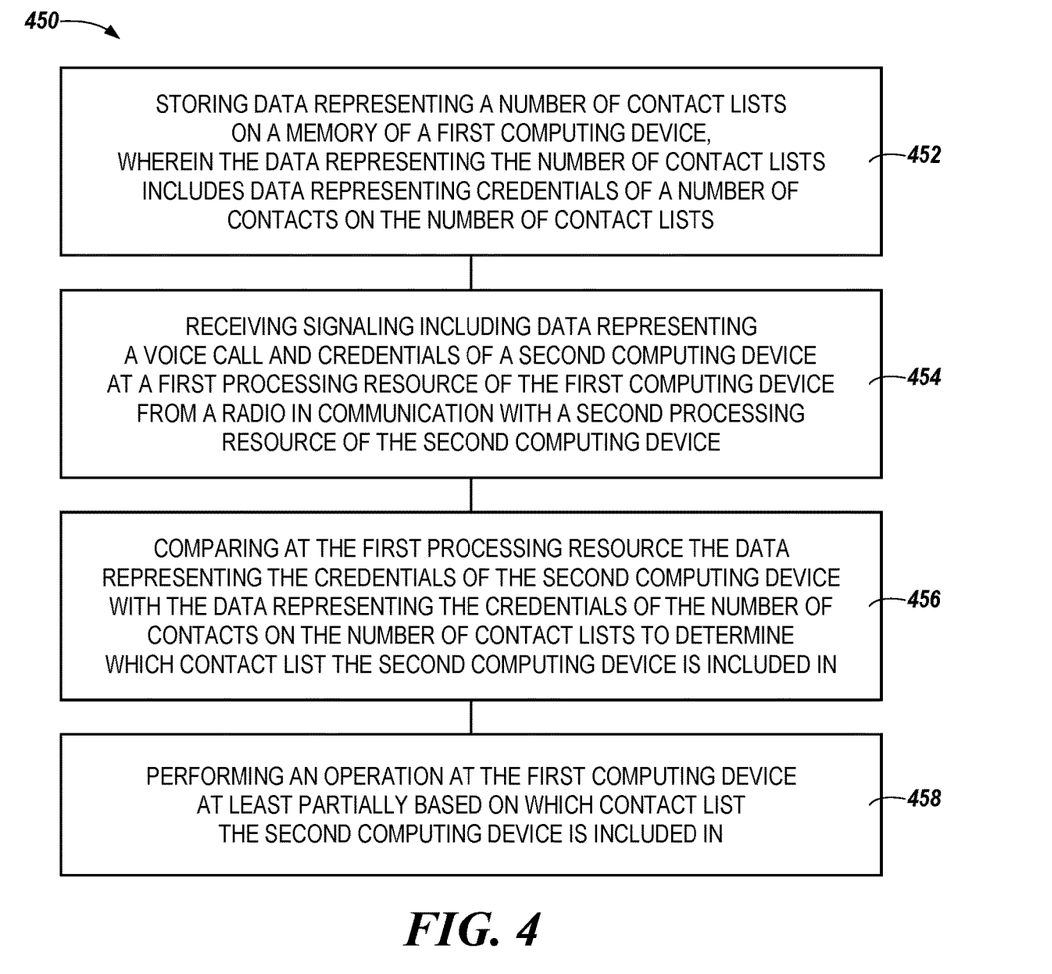
FIG. 4 illustrates an example flow diagram of a method for performing an operation responsive to a voice call in accordance with a number of embodiments of the present disclosure.

FIG. 4 illustrates an example flow diagram of a method 450 for performing an operation responsive to a voice call in accordance with a number of embodiments of the present disclosure. At block 452, the method 450 can include storing data representing a number of contact lists on a memory of a first computing device, wherein the data representing the number of contact lists includes data representing credentials of a number of contacts on the number of contact lists.

At block 454, the method 450 can include receiving signaling including data representing a voice call and credentials of a second computing device at a first processing resource of the first computing device from a radio in communication with a second processing resource of the second computing device. The first computing device can store data from the voice call, the voice message, and/or the credentials. For example, the first computing device can store credentials of the second computing device including an area code, a telephone number, and/or voice data from the voice message.

The first computing device can search the area code and/or the telephone number of the second computing device on the internet, in the user data, and/or the contact lists to collect additional information about the purpose of the voice call, the subject matter of the voice call, the importance of the voice call, and/or the identity of the caller. In some examples, the first computing device can perform voice recognition and/or word recognition on the voice data to determine the purpose of the voice call, the subject matter of the voice call, the importance of the voice call, and/or the identity of the caller. In a number of embodiments, the first computing device can input the area code, the phone number, and/or the voice data into an AI model to determine the purpose of the voice call, the subject matter of the voice call, the importance of the voice call, and/or the identity of the caller.

At block 456, the method 450 can include comparing at the first processing resource the data representing the credentials of the second computing device with data representing the credentials of the number of contacts on the number of contact lists to determine which contact list the second computing device is included in.

At block 458, the method 450 can include performing an operation at the first computing device at least partially based on which contact list the second computing device is included in. The operation can include transmitting signaling including data representing a particular message to the second processing resource of the second computing device via the radio in communication with the second processing resource of the second computing device. In some examples, the particular message can be selected by the first processing resource at least partially based on which contact list the second computing device is included in. The particular message can be a voice message, an email, or a text message. The first processing resource can select the voice message, email, or text message at least partially based on which contact list the second computing device is included in. In a number of embodiments, the particular message can include user data stored on the memory of the first computing device at least partially based on which contact list the second computing device is included in.

Performing the operation can include relaying the signaling including the data representing the voice call to a third processing resource of a third computing device via a radio in communication with the third processing resource of the third computing device at least partially based on which contact list the second computing device is included in.

In a number of embodiments, the method can further include receiving signaling including data representing a voicemail greeting at the first processing resource of the first computing device. The first processing resource can store data representing the number of voicemail greetings including the data representing the voicemail in the memory of the first computing device. In some examples, the first computing device can select a voicemail greeting of the number of voicemail greetings and transmit the voicemail greeting to the second computing device in response to receiving the signaling including the data representing the voice call and credentials of the second computing device.

The method can further include the first processing resource of the first computing device receiving signaling including data representing a voice message from the radio in communication with the second processing resource of the second computing device. In a number of embodiments, the first processing resource of the first computing device can transmit the signaling including the data representing the voice message from the first processing resource of the first computing device to a third processing resource of a third computing device via a radio in communication with the third processing resource of the third computing device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   storing data representing a number of contact lists on a memory of a first computing device, wherein the data representing the number of contact lists includes data representing credentials of a number of contacts on the number of contact lists;

receiving signaling including data representing a voice call and credentials of a second computing device at a first processing resource of the first computing device from a radio in communication with a second processing resource of the second computing device, wherein the credentials of the second computing device include a profession associated with the second computing device;

comparing at the first processing resource the profession associated with the second computing device with professions associated with the number of contacts on the number of contact lists to determine which contact list the second computing device is included in; and performing an operation at the first computing device at least partially based on which contact list the second computing device is included in.

2. The method of claim 1, wherein performing the operation at the first computing device includes transmitting signaling including data representing a particular message to the second processing resource of the second computing device via the radio in communication with the second processing resource of the second computing device, and wherein the particular message is selected by the first processing resource at least partially based on which contact list the second computing device is included in.

3. The method of claim 2, wherein the particular message is a voicemail greeting, email, or text message, and wherein the first processing resource selects the voicemail greeting, email, or text message at least partially based on which contact list the second computing device is included in.

4. The method of claim 2, wherein the particular message includes user data stored on the memory of the first computing device at least partially based on which contact list the second computing device is included in.

5. The method of claim 1, wherein the credentials of the second computing device includes a telephone number associated with the second computing device.

6. The method of claim 1, further comprising:
receiving signaling including data representing a voicemail greeting at the first processing resource of the first computing device; and
storing data representing a number of voicemail greetings including the data representing the voicemail greeting in the memory of the first computing device.

7. The method of claim 1, wherein performing the operation at the first computing device includes relaying the signaling including the data representing the voice call to a third processing resource of a third computing device via a radio in communication with the third processing resource of the third computing device at least partially based on which contact list the second computing device is included in.

8. The method of claim 1, further comprising:
receiving signaling including data representing a voice message at the first processing resource of the first computing device from the radio in communication with the second processing resource of the second computing device; and
transmitting the signaling including the data representing the voice message from the first processing resource of the first computing device to a third processing resource of a third computing device via a radio in communication with the third processing resource of the third computing device.

9. An apparatus, comprising:
a memory configured to store:
data representing a number of contact lists, wherein the data representing the number of contact lists includes data representing credentials of a number of contacts on the number of contact lists; and
data representing a number of messages; and
a processing resource configured to:
receive signaling including data representing a voice call and credentials of a computing device from a radio in communication with the computing device, wherein the credentials of the computing device include a profession associated with the computing device;
compare the profession associated with the computing device with professions associated with the number of contacts on the number of contact lists to determine which contact list the computing device is included in; and
transmit signaling including data representing one of the number of messages at least partially based on which contact list the computing device is included in.

10. The apparatus of claim 9, further comprising a sensor configured to collect user data from a user of the apparatus.

11. The apparatus of claim 10, wherein the sensor is a heart rate sensor, a gyroscope, or a global position system (GPS).

12. The apparatus of claim 10, wherein the processing resource is configured to transmit the signaling including the data representing one of the number of messages at least partially based on the user data.

* * * * *